Oct. 22, 1968    S. C. W. WILKINSON    3,407,102
METHOD OF MAKING A FLEXIBLE REINFORCED BELLOWS
Filed Dec. 11, 1964
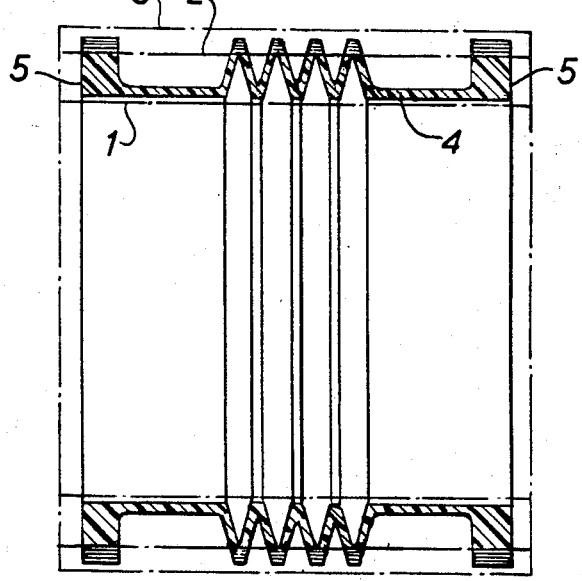
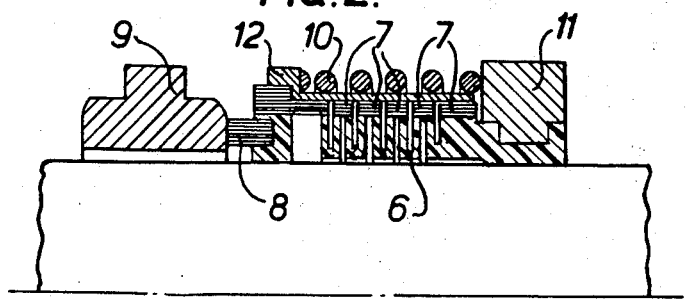
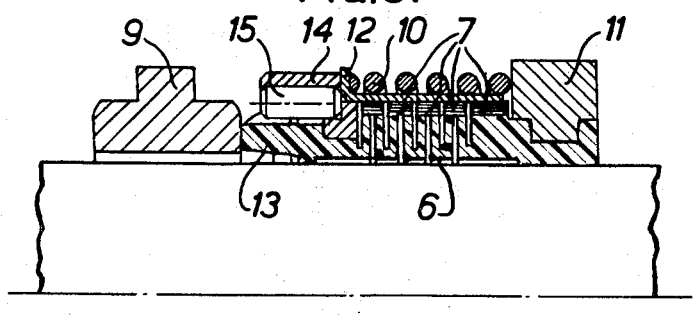

United States Patent Office 3,407,102
Patented Oct. 22, 1968

3,407,102
METHOD OF MAKING A FLEXIBLE
REINFORCED BELLOWS
Samuel Clifford Walter Wilkinson, Cookham, England, assignor to Crane Packing Limited, Slough, England, a British company
Filed Dec. 11, 1964, Ser. No. 417,758
Claims priority, application Great Britain, Dec. 11, 1963, 48,876/63
12 Claims. (Cl. 156—192)

ABSTRACT OF THE DISCLOSURE

Bellows made in a known manner by making alternate internal and external annular grooves in a thick-walled hollow cylindrical body, for example of polytetrafluoroethylene, are reinforced by using as the starting body a cylinder incorporating reinforcement adjacent its inner and/or outer surface, so that the resulting bellows are locally reinforced at the inner and/or outer tips of the pleats.

---

This invention relates to the construction of bellows made of flexible non-metallic material. Such bellows are used generally for forming fluid tight seals between relatively movable members; for example they are used in rotary mechanical seals to seal the axially movable seal face member to that part (e.g. a rotating shaft or stationary housing) with which it is associated. Such bellows are also used to form expansion joints or flexible joints in non-metallic pipework and for many other purposes. Where the bellows are subjected to internal pressure it has been proposed to enclose them in a rigid sleeve to limit their radial expansion, and another way of achieving the same result is by moulding into the bellows a helical metallic reinforcement or a series of metal rings at the crests and/or troughs of the convolutions. However both these methods have their limitations, the latter method in particular being applicable only where the material of the bellows is rubber or a rubberlike material which will form a good bond with the metal.

It is an aim of the present invention to provide a new method of manufacturing reinforced non-metallic bellows capable of withstanding pressures. For this purpose we make use of a development of the principle employed in the invention which forms the subject of our earlier British Patent No. 821,714, dated Oct. 3, 1957, in which the bellows are machined or cut from a solid tube.

According to the invention it is now proposed to form reinforced bellows by forming a hollow extended body of substantially uniform wall thickness containing reinforcing material in restricted regions of its volume adjacent its inner and/or outer surface but extending over at least the greater part of its length, and machining away or cutting parts of this body to leave bellows containing reinforcement which, considering the actual pleats of the bellows, is confined to the inner and/or outer tips of the pleats.

The body will normally be of uniform cylindrical shape. To incorporate the reinforcement at the radially innermost tips of the pleats of the bellows, the reinforcing material is wrapped round a core or mandrel and then the remainder of the body is moulded around it. Where the reinforcement is to be incorporated in the outermost tips of the pleats, the body is first formed and then wrapped in reinforcing material. It will be evident that reinforcement could be incorporated both at the inner and outer tips of the pleats or folds.

The invention is particularly applicable to bellows made from polytetrafluoroethylene. The reinforcing material is preferably glass cloth or metal mesh and it may be impregnated with polytetrafluoroethylene before it is applied. Several layers of the cloth may be built up inside or outside (or both) and the whole assembly is moulded to form a unitary block which can then be machined to form the bellows.

The great virtue of the use of a fabric, especially glass cloth or metal mesh, is that continuous strands, wires or fibres of the material extend circumferentially right round the cylindrical block to give it adequate tensile strength to resist the hoop stresses imposed by internal pressure; this strength is not achieved by normal reinforcement in the form of individual loose fibres. Yet the reinforcement, being present only where it is needed, does not interefere with the flexibility of the bellows and furthermore, being wholly embedded, is not exposed to possible corrosive action from fluids with which the bellows are in contact.

In a modification of the invention, where the invention is applied to bellows which are formed integrally with a rotary seal face member, the reinforcing glass cloth is incorporated also in the outermost parts of the seal face members as well as in the bellows portion, and in a further development the glass cloth could be in the face portion alone. Its outer part is reinforced in this way whilst its inner portions contain random glass fibre reinforcement.

The invention will now be further described by way of example with reference to the accompanying drawings, in which:

FIGURE 1 is an axial cross-section through an example of bellows constructed in accordance with the invention;

FIGURE 2 is an axial cross-section through a rotary mechanical face seal embodying bellows constructed in accordance with the invention, and also including reinforcement of a seal member formed integrally with the bellows; and FIGURE 3 is a view similar to that of FIGURE 2, but showing a seal with a replaceable carbon face.

Referring first to FIGURE 1, to make a bellows of polytetrafluoroethylene a hollow cylindrical body of that material is first formed, having the inner diameter indicated by the chain-dotted line 1 and its outer diameter as indicated by the chain-dotted line 2. The body may be of virgin polytetrafluoroethylene throughout or, where it is to form part of a rotary mechanical face seal, one or both ends of it may incorporate glass or metal powder as a filler in the manner described and claimed in the specification of our British Patent No. 821,714, dated Oct. 3, 1957.

For example the lower part of a mould of the appropriate shape may first be charged with polytetrafluoroethylene powder incorporating reinforcing material in the form of glass or metal powder, then the intermediate part of the lentgh of the mould is filled with plain polytetrafluoroethylene powder and then finally the upper portion of the mould is filled with polytetrafluoroethylene incorporating glass or metal powder reinforcing material and then the entire resultant body is moulded and sintered at a suitable pressure to form the body defined between the lines 1 and 2 in FIGURE 1.

The body thus formed is then mounted on a core pin and its outer cylindrical surface is wrapped with several layers of glass cloth, that is to say of woven glass fibre fabric, impregnated with polytetrafluoroethylene. The wrapping is continued until the diameter of the body has been substantially increased, reaching the outer chain-dotted line 3 in FIGURE 1. The whole assembly is then put into a mould and subjected to the normal moulding pressure used for polytetrafluoroethylene, is heated to sinter the polytetrafluoroethylene, and is then cooled still under pressure.

The resulting cylindrical block of virgin polytetrafluoroethylene inside and with its outer portions reinforced with glass cloth is then machined to the profile shown in full lines in FIGURE 1, to form the bellows 4 with integral end flanges 5. The method of machining, either by knifing or by cutting slots is known in itself and is shown for example in U.S. specification 2,341,556. It will be seen that, in addition to the formation of alternate internal and external grooves in the intermediate portion of the length of the cylindrical block, portions are machined away between the intermediate portion and the two ends to define the flange 5 employing known techniques as set forth, for example, in German Patent No. 1,120,120. The bellows are largely of virgin polytetrafluoroethylene but the tip of each convolution incorporates glass cloth reinforcement. Because the glass cloth has continuous strands which extend circumferentially around the tips of the convolutions, the reinforcement acts like a hoop, making the bellows virtually incapable of expanding, and making them able to withstand large internal pressures without bursting.

It will be observed that in the embodiment shown in FIGURE 1 the end flanges 5 also incorporate some of the glass cloth reinforcement near their outer peripheries. This is of particular value where the bellows are incorporated in a rotary mechanical seal and where one of these end flanges forms the seal face member to prevent distortion of it under internal pressure and this applies equally well whether or not the inner portion of the seal face member incorporates loose individual fibres as wear-resisting reinforcement in the manner set out in British Patent No. 821,714 dated Oct. 3, 1957. The glass cloth reinforcement has the very substantial advantage, as compared for example with a metal reinforcing ring, that it extends right up to the rubbing face and can wear away at the same rate as the remainder of that face.

FIGURE 2 shows a face seal incorporating bellows made in accordance with the invention. The bellows are shown at 6 and are largely of virgin polytetrafluoroethylene but, as in the embodiment shown in FIGURE 1, the tips 7 of all the convolutions are reinforced with glass cloth. The seal face member 8, formed integrally with the bellows is reinforced with glass cloth in the manner described throughout its radial thickness. The member 8 is urged into contact with a stationary seat 9 by a helical coil compression spring 10 in the usual way; this spring abuts against a metal ring 11 that locates the tail of the bellows 6. Although the embodiment illustrated retains a metal sleeve 12 around the bellows to resist expansion of the latter under internal pressure, that sleeve may normally be omitted now that the tips of the convolutions contain their own hoop reinforcement of glass cloth.

FIGURE 3 shows an arrangement similar to that of FIGURE 2 and the same reference numerals have been used where applicable. However, here, instead of the glass-cloth-reinforced seal face member 8, integral with the bellows 6, we use a separate replaceable face member 13 made of carbon. It seats against a lip 14 on the leading end of the bellows 6 and is received in a counterbored ring 14, to which it is keyed by a longitudinally extending pin 15.

While we have described the way of making bellows to incorporate the reinforcement in the radially outermost tips of the pleats or folds of the bellows, it will be understood that the reinforcement could equally well be incorporated as well (or instead) in the innermost tips of the pleats. In that case the glass cloth impregnated with polytetrafluoroethylene would first be wound onto a mandrel or core pin and then the main body of the polytetrafluoroethylene would be moulded around it.

I claim:

1. A method of making reinforced bellows comprising forming a hollow extended body of substantially uniform wall thickness, applying layers of flexible sheet reinforcing material to the external surface of said body, curing the resulting assembly by moulding and the application of heat, and cutting annular grooves at positions extending alternately from the inside and from the outside of the resulting assembly to form a bellows structure defined by pleats incorporating portions of said reinforcing material in the outermost tips thereof.

2. A method of making reinforced bellows comprising wrapping layers of flexible sheet reinforcing material around a core, forming around said layers a hollow extended body of substantially uniform wall thickness, curing the resulting assembly by moulding and the application of heat, removing the resulting assembly from the core, and cutting annular grooves at positions extending alternately from the inside and from the outside of said assembly to form a bellows structure defined by pleats incorporating portions of said reinforcing material in the innermost tips thereof.

3. A method of making reinforced bellows comprising the steps of wrapping layers of flexible sheet reinforcing material around a core, forming around said layers a hollow extended body of substantially uniform wall thickness, wrapping further layers of reinforcing material around said body, curing the resulting assembly by moulding and the application of heat, removing the resulting assembly from the core, and cutting annular grooves in said assembly in positions extending alternately from the inside and from the outside of the assembly to form a bellows structure defined by pleats incorporating portions of said reinforcing material in the innermost and outermost tips thereof.

4. A method of making fabric-reinforced polytetrafluoroethylene bellows comprising forming a hollow cylindrical body of solid polytetrafluoroethylene, wrapping around said body a plurality of layers of polytetrafluoroethylene-impregnated fabric, curing the resulting assembly by moulding and the application of heat, and cutting overlapping annular grooves in the inside and outside cylindrical surfaces of the resulting assembly at alternating positions so as to form a bellows structure defined by pleats incorporating portions of said fabric in the outermost tips thereof.

5. The method set forth in claim 4 wherein said fabric is woven glass cloth.

6. A method of making fabric-reinforced polytetrafluoroethylene bellows comprising the steps of wrapping a plurality of layers of polytetrafluoroethylene-impregnated fabric around a cylindrical core, forming over said layers a cylindrical body of solid polytetrafluoroethylene, curing the resulting assembly by moulding and the application of heat, and cutting overlapping annular grooves at positions alternately inside and outside the resulting assembly to form a bellows structure defined by pleats incorporating portions of said fabric in the innermost tips thereof.

7. The method set forth in claim 6, wherein said fabric is woven glass cloth.

8. A method of making fabric-reinforced polytetrafluoroethylene bellows comprising the steps of wrapping a plurality of layers of polytetrafluoroethylene-impregnated fabric around a cylindrical core, forming over said layers a cylindrical body of solid polytetrafluoroethylene, wrapping a plurality of further layers of polytetrafluoroethylene-impregnated fabric around said body, curing the resulting assembly by moulding and the application of heat, removing the resulting assembly comprising the two sets of layers of fabric and the body from the core and cutting overlapping annular grooves at positions alternately inside and outside said assembly to form a bellows structure defined by pleats incorporating portions of said fabric in the innermost and outermost tips thereof.

9. The method set forth in claim 8, wherein said fabric is woven glass cloth.

10. A method of making a polytetrafluoroethylene bellows structure incorporating an internal seal face member for use in the construction of a rotary mechanical face seal comprising the steps of forming a hollow cylindrical body of polytetrafluoroethylene, wrapping around said body throughout the length thereof a plurality of layers of polytetrafluoroethylene-impregnated woven glass cloth, curing the resulting assembly by moulding and the application of heat, cutting an intermediate portion of the length of the resulting assembly to form annular overlapping grooves extending alternately from the inside and outside thereof to form the bellows portions of said structure, and cutting a portion of said assembly between said intermediate portion and one end to define at said end a seal face member incorporating a portion of said woven glass cloth in the periphery thereof.

11. A method of making a polytetrafluoroethylene bellows structure incorporating an integral seal face member for use in the construction of a rotary mechanical face seal comprising the steps of forming a hollow cylindrical body of polytetrafluoroethylene, wrapping around said body over at least a portion of the length thereof a plurality of layers of reinforcing fabric, curing the resulting assembly by moulding and the application of heat, cutting an intermediate portion of the length of the resulting assembly to form annular overlapping grooves extending alternately from the inside and outside thereof to define the bellows portion of said structure, and cutting a portion of said assembly between said intermediate portion and one end to define at said end a seal face member incorporating at least a portion of said reinforcing fabric.

12. A method as set forth in claim 11 wherein said reinforcing fabric is woven glass cloth.

References Cited

UNITED STATES PATENTS

| 1,926,628 | 9/1933 | Morehouse | 138—122 |
| 2,920,656 | 1/1960 | Bertolet | 285—226 XR |

FOREIGN PATENTS 1,120,120  12/1961  Germany.

PHILIP DIER, *Primary Examiner.*